United States Patent
Kayaba et al.

(10) Patent No.: US 6,922,683 B2
(45) Date of Patent: Jul. 26, 2005

(54) CTI SERVER AND PROGRAM RECORDING MEDIUM

(75) Inventors: Chika Kayaba, Kawasaki (JP); Kouichi Noro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 305 days.

(21) Appl. No.: 09/922,699

(22) Filed: Aug. 7, 2001

(65) Prior Publication Data

US 2002/0016783 A1 Feb. 7, 2002

(30) Foreign Application Priority Data

Aug. 7, 2000 (JP) .......................................... 2000-237912

(51) Int. Cl.[7] .............................. G06N 5/02; G06F 17/00
(52) U.S. Cl. ............................... 706/50; 706/46; 706/45
(58) Field of Search ................................ 706/50, 46, 45

(56) References Cited

U.S. PATENT DOCUMENTS 6,535,728 B1 * 3/2003 Perfit et al. .................. 455/410
2002/0091636 A1 * 7/2002 Bullard et al. ................. 705/40

* cited by examiner

*Primary Examiner*—Anthony Knight
*Assistant Examiner*—Joseph P. Hirl
(74) *Attorney, Agent, or Firm*—Staas & Halsey LLP

(57) ABSTRACT

A CTI server receives calls from telephone terminals. The CTI server includes an analysis unit, an icon creating unit, and an icon display control unit. The analysis unit analyzes conditions for a call from a telephone terminal to generate parameter which represents the presumed psychological state of a customer using the telephone terminal. The icon creating unit creates an icon for visually displaying the presumed psychological state of the customer on the basis of the parameters. The icon display control unit for displaying the presumed psychological state of the customer using the icon.

9 Claims, 13 Drawing Sheets

FIG. 3A

| TELEPHONE NUMBER | NUMBER OF CALLS | INCOMING TIME |
|---|---|---|
| xxx-xxx-xxxx | 5 | 10 : 32 |

FIG. 3B

| TELEPHONE NUMBER | INDIVIDUAL DEALING CARD | ...... | INDIVIDUAL DEALING CARD |
|---|---|---|---|
| xxx-xxx-xxxx | 1 | ...... | 3 |

| | DURATION (SECONDS) | ACCUMULATED DURATION (SECONDS) | RATIO (%) | NUMBER OF TIMES |
|---|---|---|---|---|
| CONVERSATION | 3 | 60 | 60 | |
| SPEECHLESS | 2 | 5 | 5 | 1 |
| PAUSE | 10 | 35 | 35 | 2 |

FIG. 3C

| NUMBER OF TRANSFERS | TELEPHONE NUMBER | RELEVANT DEPARTMENT |
|---|---|---|
| 0 | xxx-xxx-xxxx | GENERAL AFFAIR SECTION |
| 1 | xxx-xxx-xxxx | THIRD BUSINESS SECTION |
| 2 | xxx-xxx-xxxx | FIRST BUSINESS SECTION |

FIG. 3D

| TELEPHONE NUMBER | NUMBER OF INCOMING CALLS | INCOMING CALL CARD | ...... | INCOMING CALL CARD |
|---|---|---|---|---|
| xxx-xxx-xxxx | 3 | 1 | ...... | 3 |

| NUMBER OF CALLS | INCOMING TIME |
|---|---|
| 10 | 10 : 35 |

FIG. 4A
7A

| WAITING TIME | FEELING INDEX |
|---|---|
| 5 SECONDS | 10 |
| 10 SECONDS | 20 |

FIG. 4B
7B

| NUMBER OF IN-COMING CALLS | POINT |
|---|---|
| 1 | 0 |
| 2 | 3 |

FIG. 4C
7C

| NUMBER OF TRANSFERS | POINT |
|---|---|
| 1 | 4 |
| 2 | 8 |

FIG. 4D
7D

| RATIO OF SPEECH-LESS PERIOD | FEELING INDEX |
|---|---|
| ~5% | 1 |
| 40% | 10 |

FIG. 4E
7E

| NUMBER OF SPEE-CHLESS PERIODS | POINT |
|---|---|
| 1 | 0 |
| 2 | 3 |

FIG. 4F
7F

| TOTAL FEELING INDEX | ICON LEVEL |
|---|---|
| 10~20 | Smile2_1 |
| 50~60 | Angry3_1 |

FIG. 4G
7G

| TOTAL POINT | ICON LEVEL |
|---|---|
| 1~3 | Smile2_2 |
| 25~40 | Angry3_2 |

FIG. 4H (7H)

| ICON LEVEL | NUMBER OF INCOMING CALLS | DISPLAY OF NUMBER OF TIMES | ICON TO BE DISPLAYED |
|---|---|---|---|
| Smile2_1 | 1 | NO | Smile2_1.gif |
| Smile2_2 | | YES | Smile2_2.gif |
| Angry3_1 | | NO | Angry3_1.gif |
| Angry3_2 | | YES | Angry3_2.gif |

FIG. 4I (71)

| NUMBER OF INCOMING CALLS | NUMBER OF TRANSFERS | RATIO OF SPEECHLESS PERIOD | ADVECE |
|---|---|---|---|
| 0~3 | 0 | 0 | Advice 1 |
| 0 | 0~2 | 0 | Advice 3 |
| 0 | 3~4 | 0 | Advice 4 |
| 0 | 0 | 0~5 | Advice 7 |

FIG. 4J (7J)

| TOTAL FEELING INDEX | NUMBER OF INCOMING CALLS | NUMBER OF TRANSFERS | RATIO OF SPEECHLESS PERIOD | TOTAL POINT | ICON 1 TO BE DISPLAYED | ICON 2 TO BE DISPLAYED |
|---|---|---|---|---|---|---|
| 60 | 1 | 3 | 5(%) | 33 | Angry3_1.gif | Angry3_2.gif |

FIG. 4K (7K)

| ICON TO BE DISPLAYED AND THE LIKE | ADDRESS |
|---|---|
| Smile2_1.gif | ADDRESS a |
| --- | --- |
| Advice 1 | ADDRESS b |
| --- | --- |

FIG. 5

LIST OF NEGLECTS

CALLS FROM CLIENTS BELOW HAVE BEEN NEGLECTED.
CALL THEM NOW IF POSSIBLE AND ASK WHAT THEY WANT.

| No | TELEPHONE NUMBER | NAME | MUMBER OF NEGLECTS | FINAL RECEPTION |
|---|---|---|---|---|
| 1 | 022-456-1111 | FUJIKO TATEBAYASHI | 3 | 2000/3/2 16:23 |
| 2 | 023-321-3333 | FUJIO KOYAMA | 2 | 2000/3/2 14:10 |
| 3 | 022-234-4455 | MICHIYO KAWASAKI | 1 | 2000/3/1 17:30 |
| 4 | 022-289-5678 | TOMIKICHI SHIKANUMA | 1 | 2000/3/2 10:10 |

TO OUTGOING CALL SCREEN   END

FIG. 9

| RECEIVING | ICON DISPLAY AREA | ADVICE DISPLAY AREA |
| KEPT CLIENT WAITING FOR 4 SECONDS | | |

| TELEPHONE NUMBER | 0223334444 | INCOMING CALL | OUTGOING CALL |

| RETRIEVE TELEPHONE | RETRIEVE ACCOUNT | RETRIEVE CLIENT NAME | PAUSE | DISCONNECT |

CLIENT INFORMATION | DEALING HISTORY | DEALING PATTERN

```
-*---*---*---*---*---*---*---*---*-
99/09/08 16:45:48 OPERATOR: SACHIKO SATO
CONDITIONS OF CLIENT: NORMAL
INQUIRY: CLIENT HAS NOT RECEIVED PAMPHLET HE OR SHE REQU-
ESTED ON 9/1
ACTION: CHECK FOR DELIVERY→NOT FOUND IN DELIVERY LIST
  (INTERNAL COMMUNICATION FAILURE?)
TAKE IMMEDIATE ACTION (PERSON IN CHARGE: SASAKI OF FIRST
BUSINESS SECTION)
-*---*---*---*---*---*---*---*---*-
99/09/12 16:45:48 OPERATOR: KEIKO ABE
CONDITIONS OF CLIENT: FAVORABLE
INQUIRY: PROCEDURE FOR SUBSCRIPTION TO NEW SERVICE
ACTION: EXPLAIN SERVICE AND HOW TO FILL IN APPLICATION
FORM
```

| OPERATOR | TATSUO FUJI |

CONDITIONS OF CLIENT

| FAVORABLE ▼ |

| PLAY | PAUSE | STOP | REC |

| REGISTER COMMENT |

0223334444 0191112222
2:15PM FEBRUARY 14 (MON.)

| INTO INCOMING CALL WAITING STATE |

CTI SERVER AND PROGRAM RECORDING MEDIUM

BACKGROUND OF THE INVENTION

1. Field of the Invention

The present invention relates to a CTI server and a program recording medium, and in particular to a CTI server to create a parameter which represents the presumed psychological state of a customer and to visually display the customer's presumed psychological state to an operator on a basis of a parameter, as well as a recording medium having a program for the CTI server recorded therein.

2. Description of the Related Art

With CTI (Computer Telephony Integration) or CT (Computer Telephony) it is important to properly deal with a customer when he or she calls a call center or the like. All the information required for this dealing is stored in a database, and must be efficiently used for the dealing.

It is contemplated that, for example, the "time for which a customer has been kept waiting (hereafter referred to as an "elapsed time")" may be employed as an index for determining whether the customer has been dealt with properly (that is, the customer's satisfaction). In this case, it is contemplated that the elapsed time may be displayed on a screen that is referenced by an operator at the call center (operator screen) It is also contemplated that the name of the customer kept waiting may be retrieved from the database and displayed on the screen together with the elapsed time. The operator can deal with the customer by reading this display.

In determining the customers satisfaction, the elapsed time is only an index, and it is possibly unreliable to understand the customer's presumed psychological state such as his or her unpleasant or other feelings which results from the communication over the telephone. For example, the number of times that the customer's call has been transferred, the time for which the customer has remained silent during the communication with the operator, and the like represent the customer's presumed psychological state. Thus, it is assumed that when the above points can be taken into consideration, the customer's presumed psychological state can be understood more accurately. This applies to the other departments to which the customers call is transferred.

Further, on the operator's screen, the various information is all displayed using texts. Accordingly, even when the customer's satisfaction such as the elapsed time is displayed using texts like the other information, it is not noticeable and the operator may fail to understand it though it is important to this company in dealing with the customer. Additionally, since it is only a display of texts, the operator at the call center, to whom the customer is invisible, cannot easily understand the customer's presumed psychological state such as his or her unpleasant or other feelings which results from the communication over the telephone. This applies to the other departments to which the customer's call is transferred.

SUMMARY OF THE INVENTION

It is an object of the present invention to provide a CTI server to create a parameter which represents a customer's presumed psychological state.

It is another object of the present invention to provide a program recording medium having a program recorded therein for implementing the CTI server to create a parameter which represents a customer's presumed psychological state.

The CTI server according to the present invention comprises receiving means for receiving a call from a telephone terminal, and an analysis means for analyzing condition for the call from the telephone terminal to generate a parameter which represents a presumed psychological state of a customer using the telephone terminal.

According to the CTI server of the present invention, parameter which represents the customer's presumed psychological state can be obtained on the basis of the actual state of the call from the telephone terminal. Thus, the parameters for determining the level of the customer's satisfaction can be generated on the basis not only of the elapsed time but also of the number of times that the customer's call has been transferred, the time for which the customer has remained silent, and the like. Thus, the customer's presumed psychological state can be understood more accurately. Further, the parameters can be visually displayed on an operator screen using graphics such as icons instead of texts, thus enabling the parameter which represents the customer's presumed psychological state to be displayed more accurately and noticeably enough to allow the operator to understand it easily.

Moreover, the present invention provides a program to implement the CTI server to create the parameter which represents the customer's presumed psychological state. This enables the easy implementation of the CTI server to create the parameter which represents the customer's presumed psychological state.

BRIEF DESCRIPTION OF THE DRAWINGS

FIGS. 3A to 3D are views useful for explaining the CTI server;

FIGS. 4A to 4D are views useful for explaining the CTI server;

FIG. 5 is a view useful for explaining a screen;

FIG. 9 is a view useful for explaining a screen;

DESCRIPTION OF THE PREFERRED EMBODIMENTS

Figure 1:
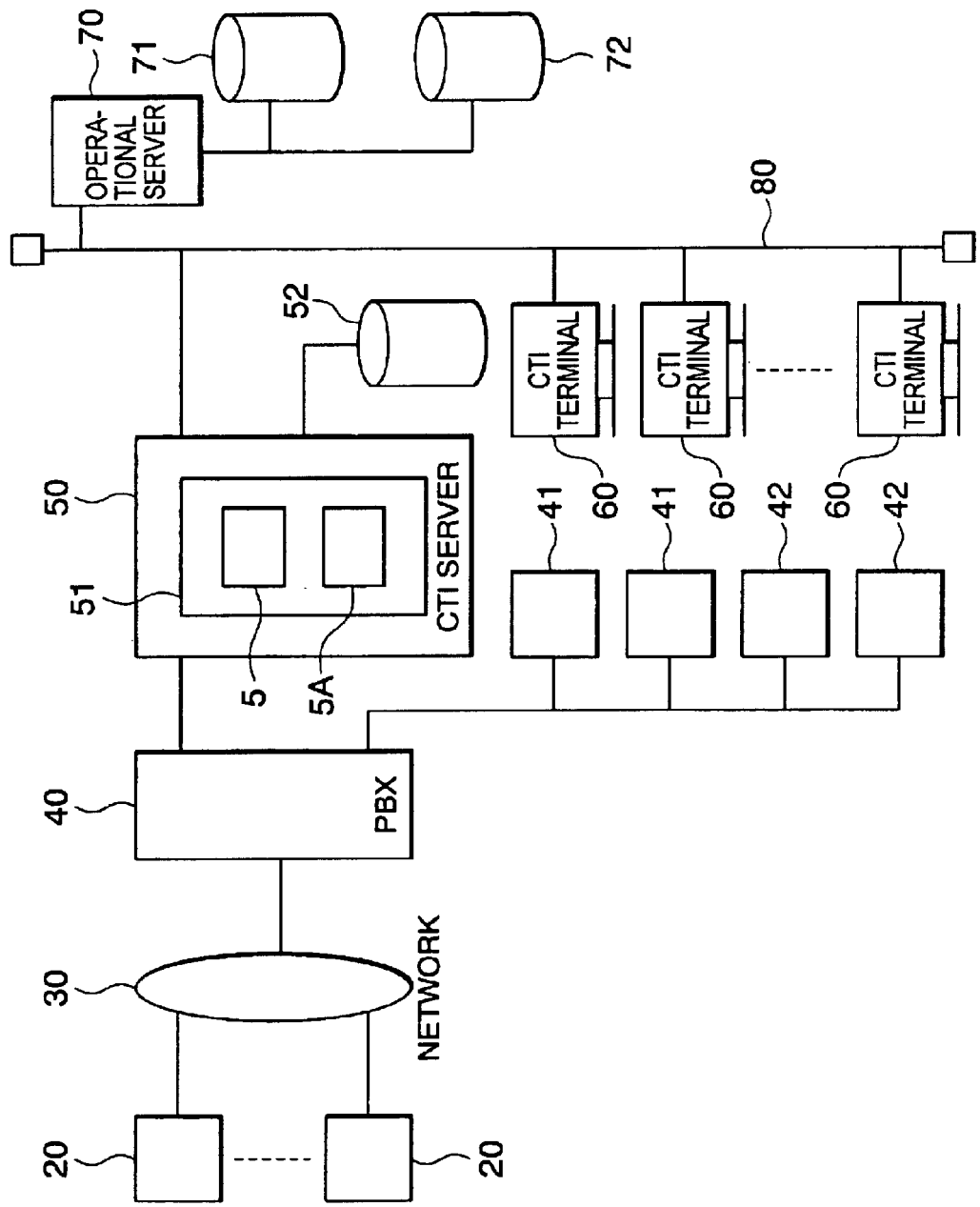
FIG. 1 is a view showing a configuration of a CTI system.

FIG. 1 is a view showing a configuration of a CTI system and shows the configuration of the CTI system including a CTI server according to the present invention.

The CTI system comprises a PBX (exchange) 40, a CTI server 50, a plurality of CTI terminals (clients) 60, an operational server 70, and a LAN (Local Area Network) 80. The PBX 40 is connected to a plurality of telephone terminals 20 via a network 30 such as a public telephone line. In addition to the CTI server 50, the PBX 40 has a plurality of multifunctional telephones 41 and a plurality of PC-DT boards 42 connected thereto. The CTI server 50 is connected to the operational server 70 via the LAN 80. The CTI server 50 comprises a CTI processing section 51 for executing various processes for the CTI server 50, and a display database 52 storing data required to create parameters 7, icons 14, and advice 15. The CTI terminal 60 is, for example, a (telephone) terminal used by an operator at a call center, and is used as a telephone with which the operator responds to a call from a customer's telephone terminal 20. The CTI terminal 60 is connected to the CTI server 50 and the operational server 70 via the LAN 80. The operational server 70 comprises an operational database 71 storing data on operations and a customer database 72 storing data on customers.

The CTI server 50, the CTI terminal 60, and the operational server 70 each comprise a CPU, a main memory, an auxiliary storage, an output device such as a display (including a display screen), and input devices (none of these components are shown). Further, the CTI terminal 60 comprises a well-known TAPI (or a TAPI board) and a headset (microphone and speakers) installed by an operator on the head (neither of them are shown). For example, the CTI terminal 60 consists of a personal computer, and the CTI server 50 and the operational server 70 each consist of a computer. The CTI processing section 51 is implemented when the CPU executes a program resident on the main memory of the CTI server 50 to execute a relevant process. The TAPI (telephony API) is implemented when the CPU executes a program resident on the main memory of the CTI terminal 60 to execute a relevant process.

Figure 2:
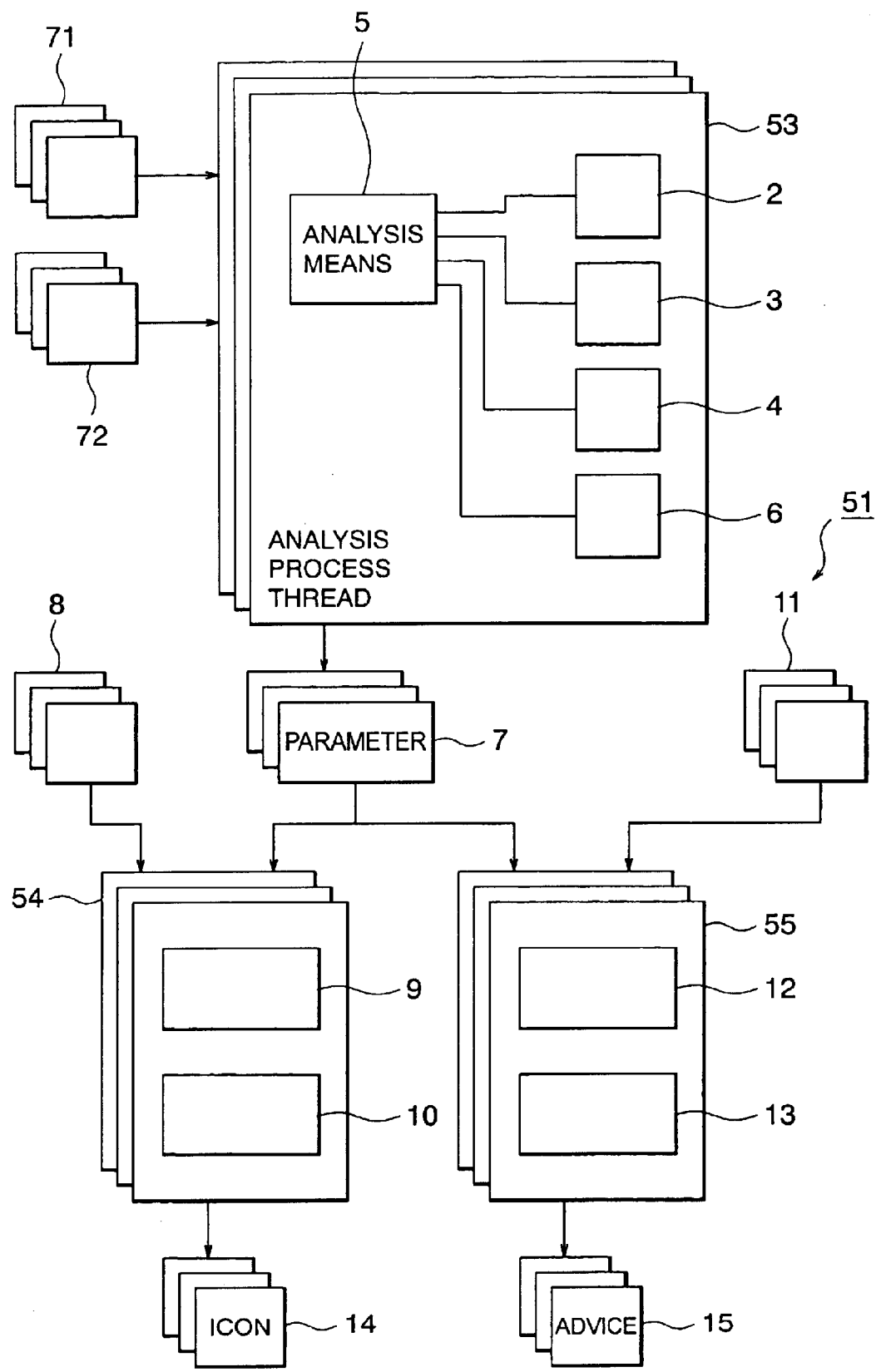
FIG. 2 is a view showing a configuration of a CTI server.

FIG. 2 is a view showing a configuration of the CTI server and shows the configuration (of the CTI processing section 51) of the CTI server 50 of the present invention.

The CTI processing section 51 of the CTI server 50 receives a call from the telephone terminal 20 via PBX40, transfers it to the plurality of CTI terminals 60, and reversely transfers calls from the plurality of CTI terminals 60 to the telephone terminal 20. Then, when the call from the telephone terminal 20 is transferred to the CTI terminals 60, the conditions for the call are monitored, and the parameters 7 are generated on the basis of the state. Then, the icons 14 are created and displayed on the basis of the parameters 7, and the advice 15 is created and displayed on the basis of the parameters 7. The icons 14 are graphics visually representing the (presumed) psychological state of a customer who is calling from the telephone terminal 20. The advice 15 is a message indicating how the operator should deal with the customer who is calling from the telephone terminal 20. Thus, the CTI processing section 51 of the CTI server 50 comprises an analysis means 5, an icon creating means 9, an icon display control means 10, an advice creating means 12, and an advice display control means 13. These means are implemented as process routines for executing relevant processes. Further, the CTI processing section 51 of the CTI server 50 references the display database 52, the operational database 71, and the customer database 72.

The CTI processing section 51 creates incoming call data 2 and no-response data 6 concurrently with or after the telephone call as information indicative of the conditions for the call from the telephone terminal 20. Similarly, the analysis means 5 creates dealing data 3 and transfer data 4 during the telephone call concurrently therewith or after it as information indicative of the conditions for the call from the telephone terminal 20. This is because an increase in the number of calls may bring the customer into a bad presumed psychological state, so that even during the telephone call, the information must be generated in real time to generate parameters 7 based on this information.

Thus, the CTI processing section 51 of the CTI server 50 generates and operates a plurality of analysis process threads 53. On the analysis process threads 53, the analysis means 5 can operate; the analysis process means 53 are generated and operated for (the telephone number of) each telephone terminal 20. For example, to promptly analyze a call from the telephone terminal 20, free analysis process threads 53 are generated and prepared in advance. Once the call from the telephone terminal 20 arrives at the CTI server 50, the CTI processing section 51, monitoring the call, assigns one of the free analysis process threads 53 as one for analyzing and processing the call from the telephone terminal 20. At the same time, one free analysis process thread 53 is generated. That is, one free analysis process thread 53 is constantly generated and prepared in advance.

For a similar reason, the analysis means 5 creates the icons 14 and the advice 15 concurrently with the call while it is being dealt with. Thus, the threads are similarly assigned to the icon creating means 9, the icon display control means 10, the advice creating means 12, and the advice display control means 13, all described later. That is, a plurality of icon processing threads 54 and advice processing threads 55 are generated and operated. On the icon processing threads 54, the icon creating means 9 and the icon display control means 10 operate, and on the advice processing threads 55, the advice creating means 12 and the advice display control means 13 operate. All these threads are generated and operated for (the telephone number of) each telephone terminal 20. As with the analysis process threads 53, one free icon processing thread 54 and one free advice processing thread 55 are generated and prepared beforehand. These threads may be assigned substantially simultaneously with the analysis process threads 53 or when the parameters 7 are generated.

As a preprocess for the generation of the parameters 7, the CTI processing section 51 monitors the conditions for the call from the telephone terminal 20, and generates information representative of the state, that is, the incoming call data 2, and the no-response data 6. To generate this information, the operational database 71 or the customer database 72 is referenced as required. The information is stored at predetermined locations of the display database 52 as required.

As a preprocess for the generation of the parameters 7, the analysis process means 5 monitors the conditions for the call from the telephone terminal 20, and generates information representative of the state, that is, the dealing data 3 and the transfer data 4. To generate this information, the operational database 71 or the customer database 72 is referenced as required. The information is generated on the analysis process threads 53 and stored at predetermined locations of the display database 52 as required.

The incoming call data 2 is created when a call from the telephone terminal 20 arrives at the CTI server 50, as shown in FIG. 3A. That is, the term "incoming call" means that the CTI server 50 has received the call irrespective of whether or not the CTI terminal 60 responds to the call (the operator picks up the telephone) As the incoming call data 2, the telephone number of the telephone terminal 20, the number of calls (the number of times that the CTI terminal 60 rings) required before the operator responds to the call (picks up the receiver of the CTI terminal 60) or the customer hangs up, and the incoming time are stored for the call (incoming). For example, with a large number of calls, the customer is assumed to be generally displeased.

The dealing data 3 represents how the CTI terminal 60 has dealt with the call from the telephone terminal 20, as shown in FIG. 3B. The dealing data 3 consists of a collection (history) of individual cards for the telephone numbers of the telephone terminals 20. One individual card stores the latest duration (seconds), the accumulated duration (seconds), the ratio (%) of the accumulated duration to the total dealing time, and the number of times (except for speech) are stored for each of a speech, speechless, and pause periods of the dealing with the telephone terminal 20. The speech period refers to the case in which speech data is present, the speechless period refers to the case in which no speech data is present, and the pause period refers to the case in which a pause button is depressed. The soundless period is counted only when it has a predetermined amount of time or more. The accumulated duration (seconds) of a speech, speechless, and pause periods are assumed to be 100%. For example, when the speechless period takes up a large percentage or the pause button has been depressed many times, the customer is assumed to be generally displeased.

The transfer data 4 is for transfers between the telephone terminal 20 and the CTI terminals 60 as shown in FIG. 3C. That is, one call has been dealt with by the plurality of CTI terminals 60. As the transfer data 4, the number of transfers, the telephone number (of the telephone terminal 20), and relevant sections (in which the CTI terminals 60 are installed) are stored for one dealing with the telephone terminal 20. When the number of transfers is zero, this means that this call is responded for the first time. For example, with a large number of transfers, the customer is assumed to be generally displeased.

Figure 11A:
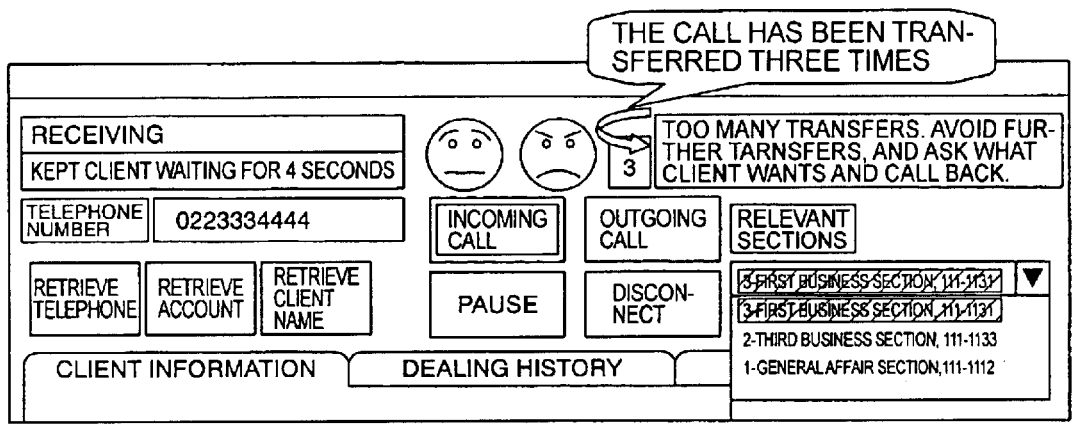
FIGS. 11A to 11C are views useful for explaining screens.

Since one telephone number corresponds to one transfer data 4, the data format may be such that the telephone number is placed at a head of the data and the relevant sections are shown so as to correspond to the number of transfers as shown in FIG. 3B. Further, the relevant sections are displayed as the history of transfers as shown in FIG. 11A. Accordingly, when no relevant sections are displayed in FIG. 11A, the storage of the relevant sections in the transfer data 4 may be omitted.

The neglect data 6 represents that no CTI terminals 60 have responded to the call from the telephone terminal 20 as shown in FIG. 3D. That is, a call was made from the telephone terminal 20, but was disconnected (by the customer) before any of the CTI terminals 60 responded to it. The neglect data 6 consists of the number of incoming calls from the telephone terminal 20 (which is not dependent on whether or not the call was responded to) and a collection (history) of (neglected) incoming call cards (data) for the telephone number of each telephone terminal 20. One incoming call card stores the number of calls and the incoming time (in this case, the time when the customer hung up) for one dealing with the telephone terminal 20. For example, with a large number of neglects or calls, the customer is assumed to be generally displeased.

The analysis means 5 monitors the call issued by the telephone terminal 20 passing through the CTI server 50 to determine that state of the call (result of the monitoring), and analyzes the state to generate the parameters 7 indicative of the presumed psychological state of the customer using the telephone terminal 20. Specifically, the analysis means 5 uses at least the incoming call data 2, the dealing data 3, and the transfer data 4 as the information representative of the conditions for the call from the telephone terminal 20 (result of the monitoring), and analyzes these data. The analysis means 5 uses the neglect data 6 as this information (result of the monitoring) as required, and analyzes this data. To generate the parameters 7, the operational database 71 or the customer database 72 is referenced as required.

The parameters 7 generated by the analysis means 5 are actually roughly classified into two types. That is, the analysis means 5 generates a first parameter 7 (71) based on information directly related to the customer's presumed psychological state for the call from the telephone terminal 20 and a second parameter 7 (72) based on the other data (which is not directly related to the customer's presumed psychological state or which is not closely related thereto even if it is directly related thereto). The first parameter 7 comprises a feeling index. The feeling index is determined by the "waiting time", the "ratio of the speechless period", or the like, as shown in FIG. 4. The second parameter 72 comprises a (presumed psychological) point. The point is determined by the "number of incoming calls", the "number of transfers", the "number of speechless periods", or the like, as shown in FIG. 4. Thus, the two different icons 14 can be displayed depending on the nature of the parameters 7.

The "waiting time" is calculated from the number of calls in the incoming call data 2 shown in FIG. 3A (normally, each call lasts two seconds and the interval between two calls is one second), and is an element that contributes to determining the feeling index. The calculated "waiting time" is converted into the feeling index that is the first parameter 71, as shown in a conversion table 7A of FIG. 4A. The value of the feeling index increases (the presumed psychological state becomes worse) consistently with the value of the "waiting time". This applies to the other elements that contribute to determining the feeling index. The correspondence between the amount of "waiting time" and the value of the feeling index is empirically determined. This applies to the other elements that contribute to determining the feeling index. In this connection, there is no upper limit for the feeling index. This also applies to the point. The conversion table 7A is stored in the display database 52 beforehand. This applies to the other conversion tables 7B to 7E, shown in FIGS. 4B to 4E. The conversion tables 7B to 7E correspond to one example of conversion and are actually specified in more detail. This applies to a dealing table 7F and others, shown in FIG. 4.

The "ratio (%) of the speechless period" is in the dealing data 3 shown in FIG. 3B, and is an element that contributes to determining the feeling index. The ratio (%) of the "speechless period" is converted into the feeling index that is the first parameter 71, as shown in a conversion table 7D, shown in FIG. 4D.

Similarly, the ratio (%) of the neglect period in the dealing data 3 shown in FIG. 3B may be used as the "ratio of the neglect period" to determine the feeling index. Also in this case, the ratio (%) of the neglect period is converted into the feeling index that is the first parameter 71.

The "number of incoming calls" (that is, the number of neglected incoming calls) is in the neglect data 6 shown in FIG. 3D, and is an element that contributes to determining the point. The "number of neglected incoming calls" is converted into the feeling index that is the second parameter 72, as shown in the conversion table 7B of the FIG. 4B. The value of the point increases linearly with the "number of incoming calls". This applies to the other elements that contribute to determining the point. The correspondence between the "number of incoming calls" and the value of the point is empirically determined. This applies to the other elements that contribute to determining the point.

The "number of transfers" is in the transfer data 4 shown in FIG. 3C, and is an element that contributes to determining the point. The "number of transfers" is converted into the feeling index that is the second parameter 72, as shown in the conversion table 7C of the FIG. 4C.

The "number of speechless periods" is in the dealing data 3 shown in FIG. 3B, and is an element that contributes to determining the point. The "number of speechless periods" is converted into the feeling index that is the second parameter 72, as shown in the conversion table 7E of the FIG. 4E.

Similarly, the number of neglects in the dealing data 3 shown in FIG. 3B may be used as the "number of neglects" to determine the point. Also in this case, the "number of neglects" is converted into the point that is the second parameter 72.

The analysis means 5 creates parameter data 7J, shown in FIG. 4J, on the basis of the first and second parameters 71 and 72 determined as described above. This parameter data constitutes the actual parameters 7. First, the sum of the feeling indices that are the first parameter 71 (total feeling index) and the sum of the points that are the second parameter 72 (total point) are determined and are stored in the parameter data 7J. Further, a predetermined one of the elements that contribute to determining the feeling index and the point is stored in the parameter data 7J. For example, as shown in FIG. 4J, this element is the "number of neglected incoming calls", the "number of transfers", or the "ratio of the speechless period". It is an element that determines the parameter 7, and itself directly constitutes the parameter 7 (in this case, it is referred to as a "direct parameter"). The direct parameter 7 has its value displayed in such a manner as to accompany the icon 14, or provides an element for creating the advice 15. That is, with this parameter, a specific message is preferably added to a visual display.

The total feeling index is associated with a first icon level (or type) that determines the first icon 14, described later, depending on the value of the index, as shown in the dealing table 7F of FIG. 4F. The total point is associated with a second icon level (or type) that determines the second icon 14, described later, depending on the value of the point, as shown in a dealing table 7G of FIG. 4G. The first and second icon levels are each associated with the name of a file in which image data on the first or second icon 14 to be displayed is stored, depending on the level, as shown in a dealing table 7H of FIG. 4H. Accordingly, the total feeling index varies with the conditions for the call, and the displayed first or the second icon 14 varies accordingly. The dealing table 7F to 7H are previously stored in the display database 52. The dealing tables 7F to 7H may be combined into one table.

The analysis means 5 uses the dealing tables 7F to 7H to determine the first and second icon levels corresponding to the previously determined total feeling index and total point, and further determines the name of the file for the first or second icon 14 t be displayed, on the basis of the determined icon levels. The display of the number of times in the dealing table 7H will be described later. With respect to the file names, the difference between "Smile2-1" and "Smile2-2" corresponds to the display of the number of times. The determined file name for the first or second icon 14 is stored in the parameter data 7J as an icon 1 or 2 to be displayed. The file name for the first or second icon 14 is associated with the address at which this image file is stored, as shown in a dealing table 7K of FIG. 4K. The dealing table 7K is stored in the display database 52. The image file for the icons is stored in the icon database 8 beforehand. When one or both of the first and second icon levels are "0", one or both of the display icons 1 and 2 are absent.

The direct parameter 7 is associated with an advice name (advice file name) with which the advice 15 data (described later) is stored, depending on the value of the parameter, as shown in a dealing table 7I of FIG. 4I. The advice name corresponds to the address at which the address file is stored, as shown in a dealing table 7K of FIG. 4K. Accordingly, the direct parameter 7 varies with the conditions for the call, and the displayed advice 15 varies accordingly. The dealing table 7I is stored in the display database 52 in advance. The advice file is stored in the advice database 11.

When, for example, the "number of incoming calls" is three and the "number of transfers" is four, the one (composite) piece of advice 15 exclusive to this case is displayed. Thus, the correspondence in this case is described in the dealing table 7I in advance. That is, in this example, it is impossible that two pieces of advice 15 are displayed on the basis of "Advice1" and "Advice4". This is to avoid providing a complicated screen by displaying plural pieces of advice 15 while the operator is dealing with the call. This applies to the other combinations of direct parameters 7.

In this example, compared to the file name for the icon 14, the direct parameter 7 is not converted into an advice name but is directly stored in the parameter data 7J. Thus, the advice creating means 12, described later, references the direct parameter 7 in the parameter data 7J. As with the file names for the icons 14, the analysis means 5 may use the dealing table 7I of FIG. 4I to determine the advice file name for the advice 15 to be displayed, on the basis of the direct parameter 7, and may store the determined advice file name in the parameter data 7J.

The CTI processing section 51 comprises a callback instructing means 5A as shown in FIG. 1. The callback instructing means 5A uses the neglect data 6 shown in FIG. 3D as information indicative of the conditions for the call from the telephone terminal 20. That is, the callback instructing means 5A analyzes the neglect data 6 to instruct the operator to call the telephone terminal 20 when the number of incoming calls or neglects (that is, the number of neglected incoming call cards) is equal to or larger than a predetermined value.

This instruction is executed by the callback instructing means 5A by, for example, displaying a relevant instruction message on (the operator screen of) the CTI terminal 60, as shown in FIG. 5. For example, a CTI terminal which does not respond to another telephone terminal 20 is selected to display the message. In FIG. 5, the telephone number of the telephone terminal 20 that has been neglected, the name of the customer, the number of neglects, and the last reception time. Then, when, for example, the number of incoming calls is three, the operator can call the customer who has made three telephone calls, none of which been neglected, thus pacifying the customer's feelings.

The icon creating means 9 creates the icon 14 for visually displaying the customer's presumed psychological state, on the basis of the parameter 7 (parameter data 7J). The icon display control means 10 visually displays the customer's presumed psychological state using the created icon 14. To carry out this display, the icon creating means 9 and the icon display control means 10 reference the icon database 8. As described previously, the icon creating means 9 and the icon display control means 10 operate on the same thread for the same call from the telephone terminal 20.

Specifically, the icon creating means 9 references a dealing table 7K of FIG. 4K on the basis of the file name for the first or second icon 14 to be displayed for the parameter 7, and reads image data from the corresponding address of the file in the icon database 8 to create the icon 14. The icon display control means 10 displays the icon 14 on the CTI terminal 60 dealing with the call from the telephone call 20. When the call from the telephone terminal 20 has been neglected, the icon display control means 10 displays the icon 14 on all the CTI terminals 60 or the other CTI terminals 60, which have not responded to the call yet.

When the dealing table 7H shows that the number of times is to be displayed, the value of the predetermined direct parameter 7 is displayed together with the displayed icon 14. In this case, the displayed icon 14 is the second icon, and, for example, the value of the direct parameter 7 that has contributed most greatly to the total point is displayed. To carry out this display, the icon creating means 9 references the dealing table 7H to check whether the number of times is to be displayed for the displayed icon 14.

The advice creating means 12 creates the advice 15 for showing the operator properly dealing with the customer based on the parameter 7 (parameter data 7J). The advice display control means 13 displays the created advice 15. To carry out this display, the advice creating means 12 and the advice display control means 13 reference the advice database 11. As described previously, the advice creating means 12 and the advice display control means 13 operate on the same thread for the same call from the telephone terminal 20.

Specifically, the advice creating means 12 references the dealing table 7I of FIG. 4I on the basis of the direct one of the parameters 7 to determine the advice name, and references the dealing table 7K of FIG. 4K on the basis of the advice name to read advice data from the corresponding address of the file in the advice database 11 to create the advice 15. The advice display control means 13 displays the advice 15 on the CTI terminal 60 dealing with the call from the telephone call 20. When the call from the telephone terminal 20 has been neglected, the icon display control means 10 displays the icon 14 on all the CTI terminals 60 or the other CTI terminals 60, which have not responded to the call yet.

Figure 6:
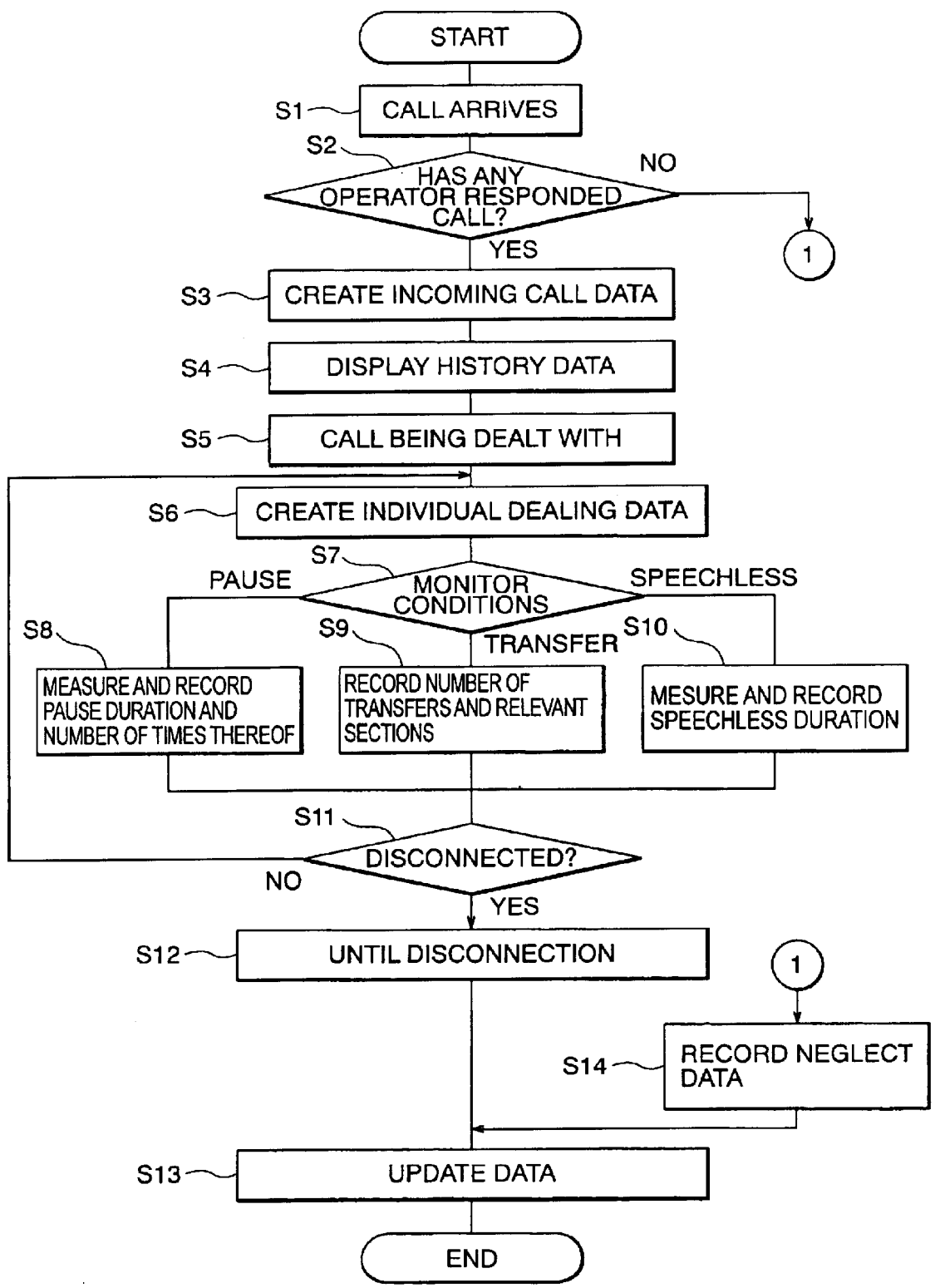
FIG. 6 is view showing a process flow executed by the CTI server.

FIGS. 6 to 8 show a CTI server process flow executed by the CTI processing section 51 and others of the CTI server 50.

In FIG. 6, when a call from the telephone terminal 20 arrives at the CTI processing section 51 (step S1), which has been waiting for a call from the telephone terminal 20, the CTI processing section 51 checks whether the (operator of the) CTI terminal 60 has responded to the call (picked up the receiver) (and which CTI terminal 60 has responded) (step S2).

When any CTI terminal 60 has responded the call, the CTI processing section 51 creates the incoming call data 2 for this incoming call, stores the data in the display database 52 (step S3), and displays history data (operational data and customer data) for the telephone number of the telephone terminal 20, on the CTI terminal 60 corresponding to this call (step S4).

FIG. 9 shows an example of the history data. In this figure, the customer database 72 is referenced to display the customer data in a customer information section (see FIG. 12), and the operational database 71 is referenced to display the operational data in corresponding history and pattern sections. This screen is provided with an icon display area and an advice display area. In fact, when step S5 is executed, the icon 14 and others are immediately displayed in these areas. Additionally, FIGS. 10 and 11 principally show these areas.

When any CTI terminal 60 is brought into the state where it is dealing with the call (step S5), the CTI processing section 51 assigns the analysis process treads 53 to the analysis means 5, the icon processing threads 54 to the icon creating means 9 and the icon display control means 10, and the advice processing threads 55 to the advice creating means 12 and the advice display control means 13. The analysis means 5 references the display database 52 using the telephone number of this telephone terminal, and creates the parameter 7 on the basis of this incoming call data 2 and the existing neglect data 6. On the basis of the parameter 7, the icon creating means 9 and the icon display control means 10 creates and displays the icon 14.

Subsequently, the analysis means 5 starts generating (updating) individually the dealing data 3 and transfer data 4 while the operator is dealing with the call (step S6), and first monitors the state of the dealing individually (step S7). When the state of the dealing is "pause", the analysis means 5 and others display and/or record the pause duration or the number of pause states (step S8). When the state of the dealing is "transfer", they display and/or record the number of transfers or the relevant sections (step S9). When the state of the dealing is "speechless", they measure and display and/or record the speechless duration (step S10). These processes will be described later with reference to FIGS. 7 and 8. Subsequently, the analysis means 5 checks whether or not the call has been disconnected (while the CTI terminal 60 is dealing with the call) (step S11). When the call has not been disconnected, the analysis means 5 repeats step 6 and subsequent steps. When the call has been disconnected, the analysis means 5 completes the process on this call (step S12). That is, the analysis means 5 and the like stores the dealing data 3 and the transfer data 4 in the display database 52, releases the threads, and passes the control to the CTI processing section 51.

The CTI processing section 51 updates the history data (operational data and customer data) (step S13) to complete the process. On the other hand, at step S2, when no CTI terminals 60 have responded to the call, the CTI processing section 51 creates the neglect data 6 to store it in the display database 52 (step S14) and then executes step S13.

Figure 7A:
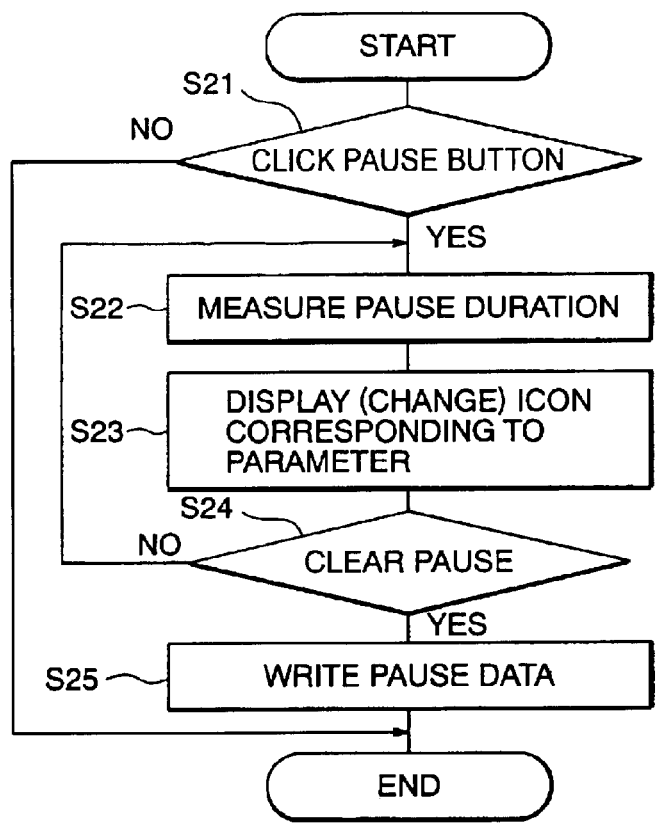
FIGS. 7A and 7B are views showing a process flow executed by the CTI server.

FIG. 7A shows a process flow executed at step S8 when the dealing is in the pause state.

The analysis means 5 checks whether or not the pause button on (the operator screen of) the CTI terminal 60 has been clicked (step S21). When it has not been clicked, the analysis means 5 completes the process. When it has been clicked, the analysis means 5 measures the pause duration in the dealing data 3, generates the dealing data 3, and generates the parameter 7 on the basis of the generated dealing data 3 (step S22). Accordingly, the icon creating means 9 creates the icon 14, and the icon display control means 10 displays it (step S23). Simultaneously, if necessary, the advice creating means 12 creates the advice 15, and the advice display control means 13 displays it. Subsequently, the analysis means 5 checks whether or not the pause state has been cleared (step S24). When it has not been cleared, the analysis means 5 repeats step S22 and the subsequent steps. When it has been cleared, the analysis means 5 writes the dealing data 3 with the pause data updated, to the display database 52 (step S25), and then completes the process.

The "waiting time" is also determined from the number of calls in the incoming call data 2 to display the corresponding icon 14 and advice 15, as in the process flow of FIG. 7A.

Figure 7B:
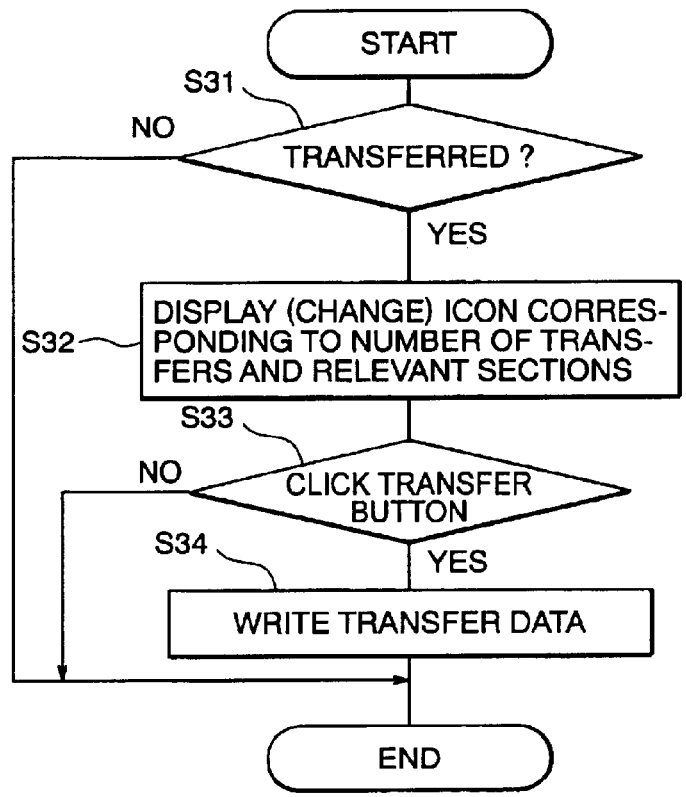

FIG. 7B shows a process flow executed at step S9 when the dealing is in the transfer state.

By using the telephone terminal of the telephone terminal 20 to reference the transfer data 4 in the display database 52, the analysis means 5 checks whether or not the call has been transferred to this CTI terminal 60 from another CTI terminal 60 (step S31). When it has not been transferred from another CTI terminal, the analysis means 5 completes the process. When it has been transferred from another CTI terminal, the analysis means 5 generates the transfer data 4 on this transfer and generates the parameter 7 on the basis of the transfer data 4, the icon creating means 9 creates the icon 14 on the basis of the number of transfers, and the icon display control means 10 displays the corresponding icon 14 and relevant sections (step S32). At the same time, if necessary, the advice creating means 12 creates the advice 15, and the advice display control means 13 displays it. Subsequently, the analysis means 5 checks whether or not a transfer button on (the operator screen of) this CTI terminal 60 has been clicked (step S33). When it has not been clicked, the analysis means 5 completes the process. When it has been clicked, the analysis means 5 writes the transfer data 4 to the display database 52 (step S34), and then completes the process.

Also for the number of incoming calls in the neglect data 6, the number of (neglected) incoming calls is determined on the basis of the neglect data 6 to display the corresponding icon 14 and advice 15, as in the process flow of FIG. 7B.

Figure 8A:
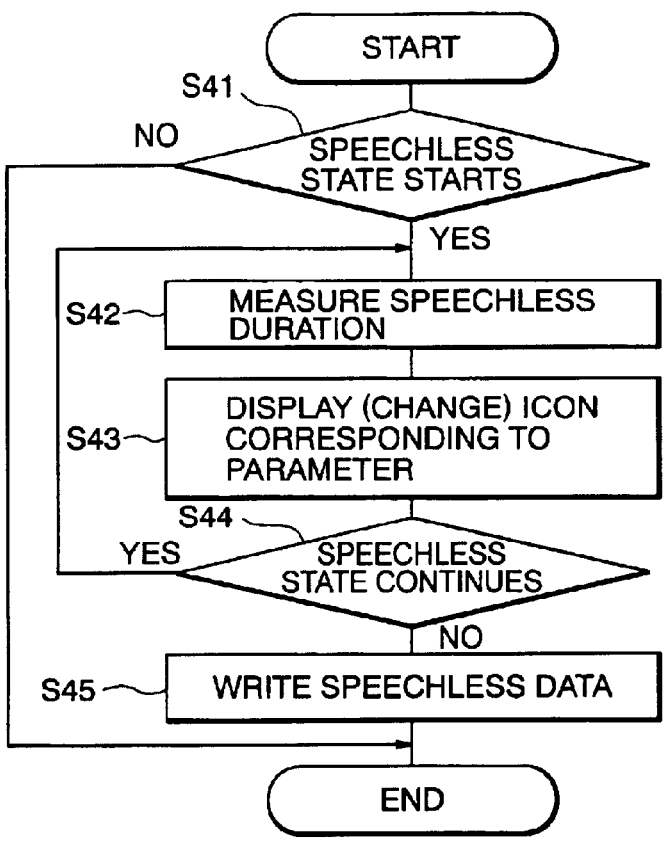
FIGS. 8A and 8B are views showing a process flow executed by the CTI server.

FIG. 8A shows a process flow executed at step S10 when the dealing is in the speechless state.

The analysis means 5 checks whether or not the speechless state has been started (step S41). When it has not been started, the analysis means 5 completes the process. When it has been started, the analysis means 5 measures the speechless period in the dealing data 3, generates the dealing data 3, and generates the parameter 7 on the basis of the dealing data 3 (step S42). Accordingly, the icon creating means 9 creates the icon 14, and the icon display control means 10 displays (changes) it (step S43). Simultaneously, if necessary, the advice creating means 12 creates the advice 15, and the advice display control means 13 displays (changes) it. Subsequently, the analysis means 5 checks whether or not the speechless state still continues (step S44). When it still continues, the analysis means 5 repeats step S42 and the subsequent steps. When it no longer continues, the analysis means 5 writes the dealing data 3 with the speechless period data updated, to the display database 52 (step S45), and then completes the process.

When the dealing is not in the pause, transfer, or speechless state, then it is in the speech state. Thus, when the dealing is not in the pause, transfer, or speechless state, the dealing data 3 with the speech data updated is written to the display database 52 as in FIG. 8.

Figure 8B:
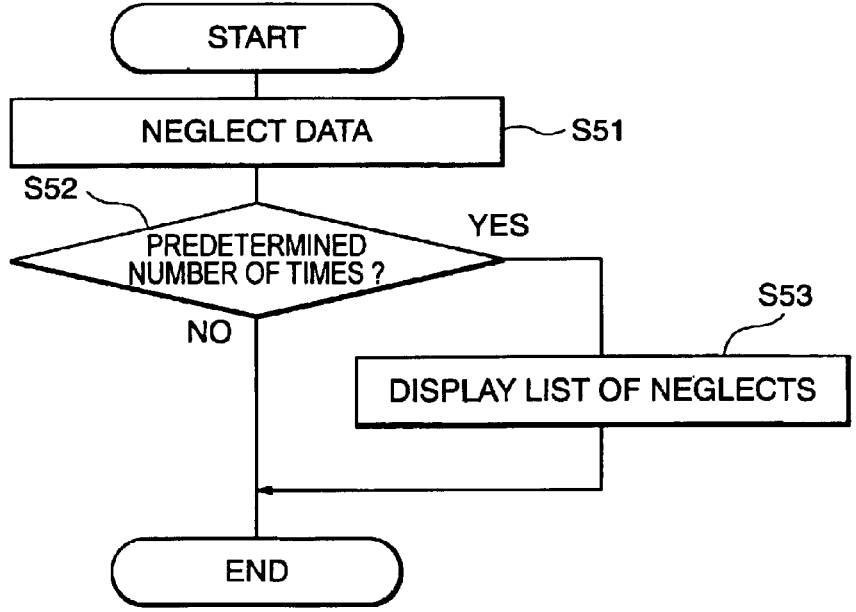

FIG. 8B shows a process flow executed at step S14 when the CTI terminal 60 has not responded to the call.

The CTI processing section 51 creates the neglect data 6 for the neglected call, to store it in the display database 52 (step S51), and checks whether the number of incoming calls (or the number of neglects) in the created neglect data 6 exceeds a predetermined value (step S52). When it is equal to or less than the predetermined value, the CTI processing section 51 completes the process. When it exceeds the predetermined value, (the callback instructing means 5A of) the CTI processing section 51 displays the screen shown in FIG. 5 on (the operator screen of) the CTI terminal 60 to instruct the operator to call the telephone terminal 20 (step S53), thereby completing the process.

FIGS. 10 and 11 show examples of screens (operator screens) displayed on the CTI terminal 60 due to the above processes and on which the icon 14 and the advice 15 are displayed in accordance with the parameter 7.

FIGS. 10A to 10D show screens displayed when a call arrives from the telephone terminal 20 (or during the pause state) and when the call has been kept waiting for a certain time.

Figure 10A:
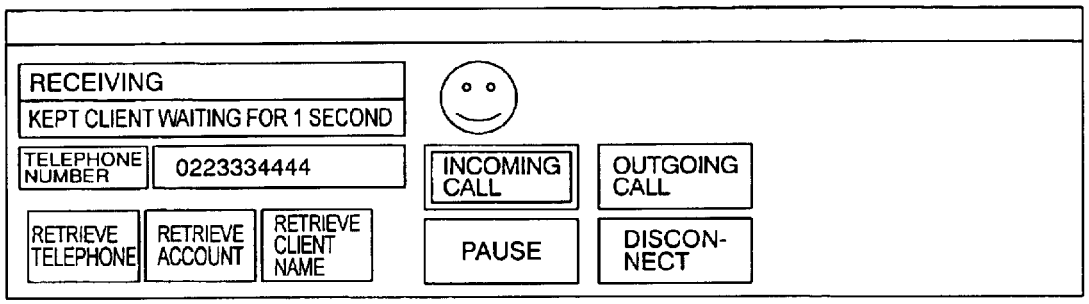
FIGS. 10A to 10D are views useful for explaining screens.

In FIG. 10A, it is assumed that at step S2, a certain CTI terminal 60 is receiving the call from the telephone terminal 20 (the operator has pick up the receiver to start dealing with the call). It is also assumed that the "waiting time" is one second and is thus short.

In this case, at step S4, the history data shown in FIG. 9 is displayed (this applies to the example described below), and at step S8, the icon 14 for the "waiting time" is displayed as in the process flow of FIG. 7A (this applies to FIGS. 10B to 10D). That is, since the "waiting time" is one second and is thus short, the feeling index has a very small value, and the total feeling index also has a small value, as is apparent from FIG. 4A. Accordingly, the icon level is smile . . . as is apparent from FIG. 4F. As a result, as shown in FIG. 10A, the icon 14 of a smiling face is displayed on the receiving CTI terminal 60. Subsequently, step S6 and the subsequent steps are repeated until the call is disconnected at step S11.

Figure 10B:
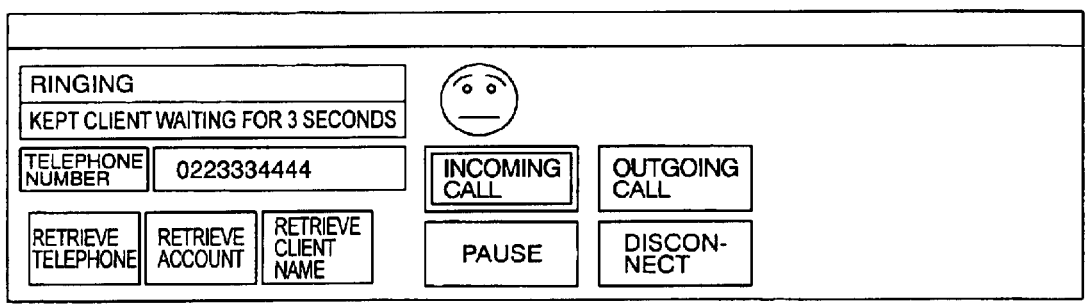

On the other hand, in FIG. 10B, it is assumed that in spite of a call from the telephone terminal 20, none of the CTI terminals 60 have responded to it, so that the customer has been kept waiting for three seconds. In this case, after the operator has started responding to the call in step S2, since the customer has been kept waiting for a little while, the icon 14 of a little gloomy face is displayed on the receiving CTI terminal 60 in step S8 as shown in FIG. 10B.

Figure 10C:
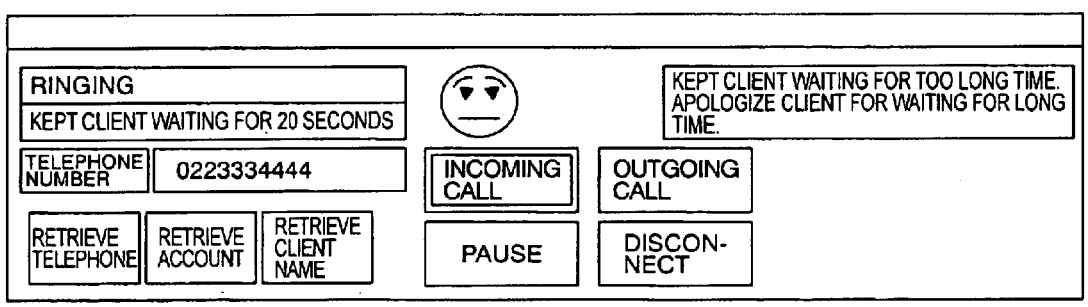

Furthermore, when it is assumed that the "waiting time" is 20 seconds and the customer has thus been kept waiting for a long time, as shown in FIG. 10C, then after the operator has started responding to the call at step S2, the icon 14 of a relatively gloomy face is displayed on the receiving CTI terminal 60 at step S8.

Figure 10D:
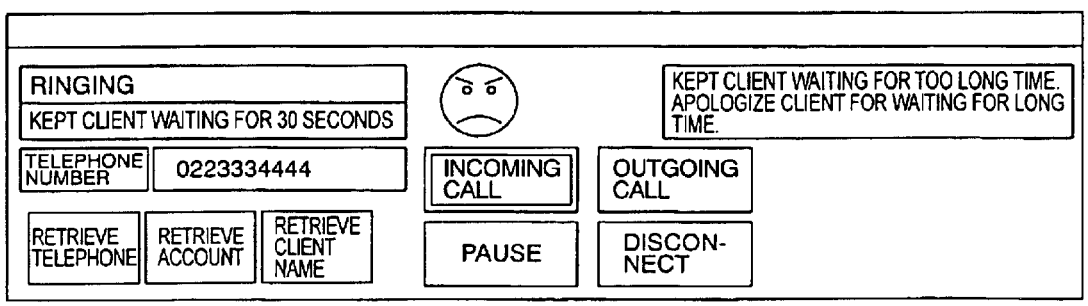

Moreover, when it is assumed that the "waiting time" is 30 seconds and the customer has thus been kept waiting for a very long time, as shown in FIG. 10D, then after the operator has started responding to the call at step S2, the icon 14 of an angry face is displayed on the receiving CTI terminal 60 at step S8.

In FIGS. 10C and 10D, at step S8 (step S23), the advice 15 is displayed together with the icon 14, thereby advising the operator to apologize to the customer for the long "waiting time". In these cases, since only the incoming call data 2 is created (no transfer data 4 or neglect data 6 is created), the one icon 14 is displayed, with the corresponding advice 15 displayed.

Even if the call is in the pause state, then at step S8, the icon 14 and the advice 15, if necessary, are displayed on the held CTI terminal 60, depending on the duration of the pause state, as in FIGS. 10A to 10D.

FIG. 11A shows a screen displayed when the call from the telephone terminal 20 is transferred and when the call has been kept waiting for a certain time due to this transfer.

In FIG. 11A, it is assumed that at step S7, a transfer of the call from the telephone terminal 20 from a sending CTI terminal 60 to a receiving CTI terminal 60 is detected and the receiving CTI terminal 60 is receiving the call. It is also assumed that this transfer is the third and requires four seconds before the call arrives at the receiving CTI terminal (from the time the source clicks the transfer button until the time the destination receives the call).

In this case, the number of transfer is three and is thus large, so that at step S9, the second icon 14 of an angry face (based on the point) is displayed on the right side of the screen of the receiving CTI terminal 60. The number of transfers is displayed together with the second icon 14. That is, the fact that this transfer is the third is represented by the number of transfer "3" and by the text "the call has been transferred three times". The advice 15 associated with the second icon 14 is also displayed, advising the operator to apologize to the customer for the large number of transfers. Furthermore, transfer history is displayed below the advice 15. The transfer history consists of the departments to which the CTI terminals 60 to which the call has been transferred belong and the number of transfers. The receiving CTI terminal 60 can thereby understand the history of transfers.

Further, after steps S9 to S11, the first icon 14 of the little gloomy face (based on the feeling index) is displayed on the left side of the screen of the receiving CTI terminal 60 at step S8 because the "waiting time" due to the transfer is four seconds and the customer has thus been kept waiting for a little while.

Even if the two icons 14 are thus displayed, the operator need not be conscious what each of the icons 14 means. For example, when one icon 14 of the angry face is displayed, the operator has only to determine that the customer is angry. When two such icons are displayed, the operator has only to determine that the customer is very angry. Further, when the operator is familiar with the screens, he or she can understand the meaning of the icon 14 depending on its location.

Figure 11B:
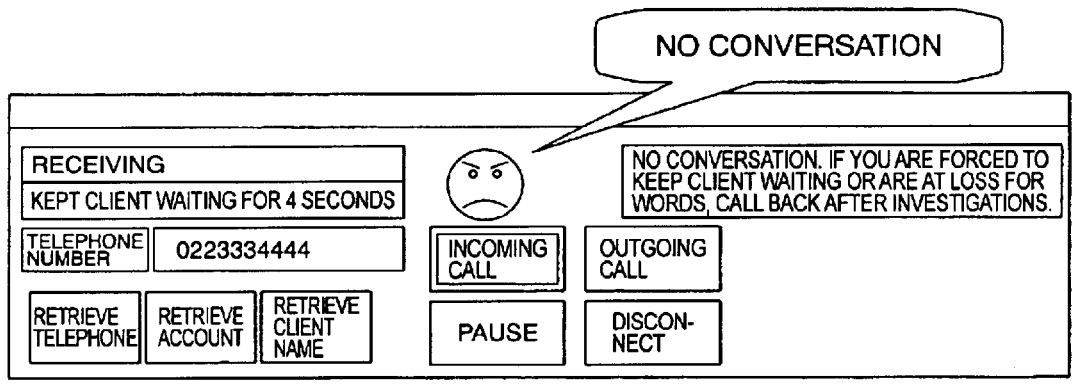
Figure 12:
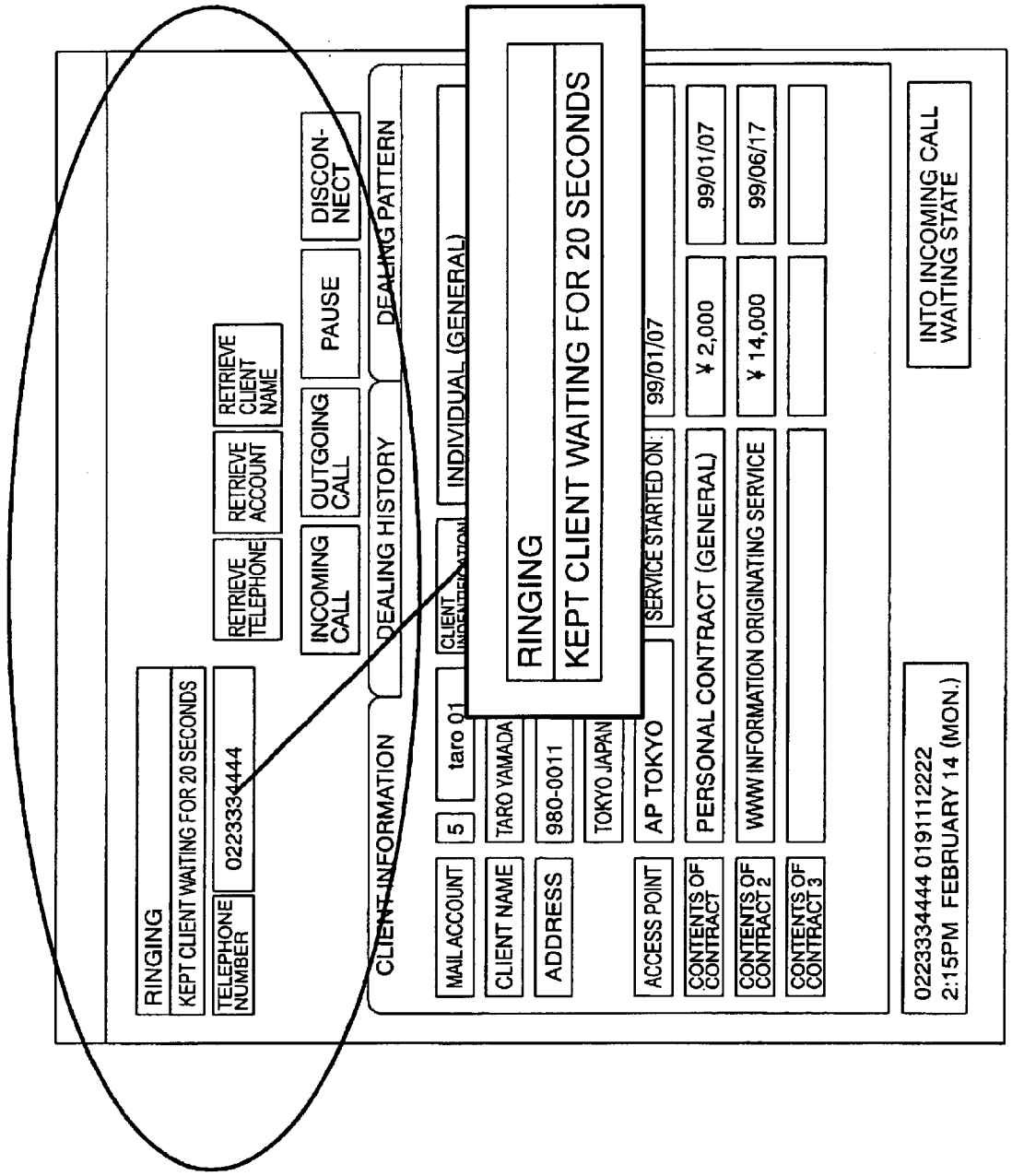
FIG. 12 is a view useful for explaining the background art.

FIG. 11B shows a screen displayed when the call from the telephone terminal 20 is dealt with and when the customer remains silent for a long time (the customer is displeased).

In FIG. 11B, it is assumed that the call from the telephone terminal 20 is being dealt with but the customer stops speaking (sound data is discontinued) at step S7 and remains silent. In this case, it is assumed that the customer remains silent because he or she is displeased with the response for some reason or the operator is at a loss for words. Due to the long speechless duration, the icon 14 of the angry face is displayed on the left side of the screen of the CTI terminal 60 at step S10. The face of the icon 14 varies with the speechless duration as shown in FIG. 10. That is, each time step S10 is repeated after step S11, the face of the icon 14 varies sequentially from the little gloomy one through the gloomy one and the relatively gloomy (little angry) one to the angry one. Further, the advice 15 associated with the icon 14 is displayed, advising the operator to call back the customer.

Figure 11C:
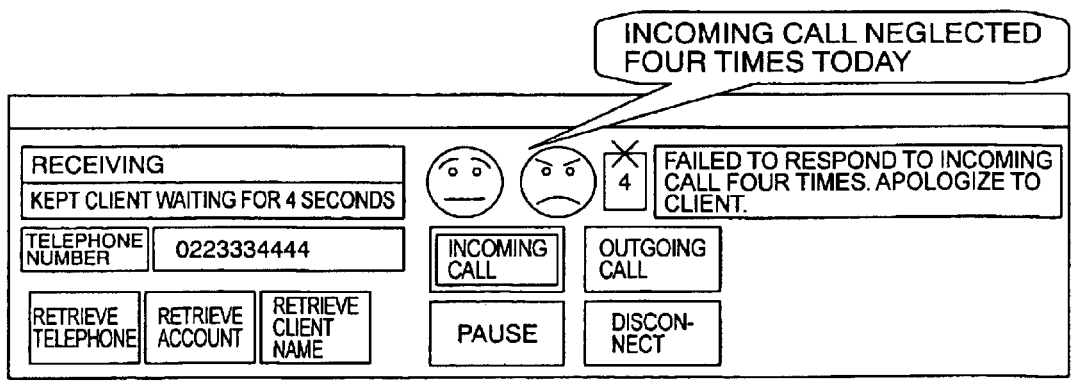

FIG. 11C shows a screen displayed when the call from the telephone terminal 29 has been neglected many times (the customer has been forced to make many calls).

In FIG. 11C, it is assumed that although the operator has started dealing with the call from the telephone terminal 20 at step S2, the call has been neglected four times due to responses to other calls. It is also assumed that four seconds were required before the call was responded to for the first time.

In this case, the customer is assumed to be dissatisfied with the response because the call has been neglected four times. Consequently, for the number of neglected incoming calls, the second icon 14 of the angry face is displayed on the right side of the screen of the CTI terminal 60 at step S9, as in the process flow of FIG. 7B. The corresponding number of times is displayed together with the second icon 14. That is, the fact that the call has been neglected four times is represented by the corresponding number of incoming calls "4" and by the text "incoming call has been neglected four times today". The advice 15 associated with the second icon 14 is also displayed, advising the operator to apologize to the customer for the large number of neglected incoming calls.

Further, as described previously, after steps S9 to S11, the first icon 14 of the little gloomy face is displayed on the left side of the screen of the receiving CTI terminal 60 at step S8 because the "waiting time" is four seconds and the customer has thus been kept waiting for a little while.

As described above, according to the present invention, the CTI server can analyzes the conditions for a call from the telephone terminal to generate the parameter which represents the presumed psychological state of the customer using this telephone terminal, thus generating the parameters for determining the level of the customer's satisfaction on the basis of the various information. Consequently, the customer's presumed psychological state can be understood more accurately. Further, these parameters can be visually displayed using graphics such as icons instead of texts, thus enabling the customer's presumed psychological state to be displayed more accurately and noticeably enough to allow the operator to understand it easily. Therefore, the customer can be dealt with properly.

What is claimed is:

1. A computer telephony integration (CTI) server to handle calls, comprising:

receiving means for receiving a call of a customer from a telephone terminal; and analysis means for analyzing state conditions of the call from the telephone terminal concurrently with the call, during the call, and/or after the call, to generate a parameter based on the state conditions of the call, the parameter representing a presumed psychological state of the customer using the telephone terminal, wherein the analysis means analyzes state condition of the call to generate the parameter representing the presumed psychological state of the customer by analyzing at least incoming call data obtained when the call from the telephone terminal has arrived, dealing data on dealing with the call from the telephone terminal, and transfer data on transfer of the call from the telephone terminal, each representing the state conditions of the call.

2. The CTI server according to claim 1, further comprising:

icon creating means for creating an icon to visually display the presumed psychological state of the customer on a basis of the parameter; and icon display control means for displaying the presumed psychological state of the customer by using the icon.

3. The CTI server according to claim 1, further comprising:

advice creating means for creating an advice on a basis of the parameter to indicate properly dealing with the customer; and advice display control means for displaying the advice.

4. The CTI server according to claim 1, further comprising:

callback instructing means for analyzing a neglect data to indicate that the telephone terminal is to be called in a case that a number of incoming calls or a number of times that the call has been neglected in the neglect data for the call from the telephone terminal is equal to or more than a predetermined value, the neglect data being obtained when the call from the telephone terminal has been neglected and being information which represents the state conditions of the call from the telephone terminal.

5. The CTI server according to claim 1, wherein the analysis means generates a first and second parameters, the first parameter being based on information directly related to a psychological state of the customer concerning the call from the telephone terminal by being generated by analyzing first state conditions comprising at least one of waiting time of the call from the telephone terminal and ratio of speechless periods of the call from the telephone terminal, and the second parameter being based on other information not directly related to the psychological state of the customer by being generated by analyzing second state conditions comprising at least one of number of incoming calls of calls from the telephone terminal and number of speechless periods of the calls from the telephone terminal.

6. The CTI server according to claim 5, further comprising:

icon creating means for creating an icon to visually display the presumed psychological state of the customer on a basis of the parameters; and icon display control means for displaying the presumed psychological state of the customer by using the icon, wherein the icon creating means creates a first and second icons on a basis of the first and second parameters respectively, and wherein the icon display control means displays the first and second icons.

7. The CTI server according to claim 1, wherein the analysis means generates the parameter based on the state of the call from the telephone terminal concurrently with ringing of the call and while the call is being dealt with.

8. A computer-readable recording medium having a program recorded therein for implementing a computer telephony integration (CTI) server to handle calls, wherein the recording medium has the program recorded therein, the program causing a computer as the CTI server to execute, a process of receiving a call of a customer from a telephone terminal; and a process of analyzing state conditions of the call from the telephone terminal concurrently with the call, during the call, and/or after the call, to generate parameter based on the state conditions of the call, the parameter representing a presumed psychological state of the customer using the telephone terminal, wherein the analyzing of the state conditions of the call to generate the parameter representing the presumed psychological state of the customer comprises analyzing at least incoming call data obtained when the call from the telephone terminal has arrived, dealing data on dealing with the call from the telephone terminal, and transfer data on transfer of the call from the telephone terminal, each representing the state conditions of the call.

9. A method, comprising:

receiving at a computer server a customer call from a telephone terminal; and analyzing state conditions of the received telephone terminal call concurrently with the call, during the call, and/or after the call, to generate at least one customer parameter based on the state conditions of the received telephone terminal call, the at least one customer parameter representing a presumed psychological state of the calling customer, wherein the analyzing of the state conditions of the call to generate the at least one customer parameter comprises analyzing at least incoming call data obtained when the call from the telephone terminal has arrived, dealing data on dealing with the call from the telephone terminal, and transfer data on transfer of the call from the telephone terminal, each representing the state conditions of the call.

* * * * *

UNITED STATES PATENT AND TRADEMARK OFFICE
CERTIFICATE OF CORRECTION

PATENT NO. : 6,922,683 B2
DATED : July 26, 2005
INVENTOR(S) : Chika Kayaba et al.

It is certified that error appears in the above-identified patent and that said Letters Patent is hereby corrected as shown below:

Column 15,
Line 32, delete "," and insert -- : -- after "execute".

Column 16,
Line 3, after "generate" insert -- a --.

Signed and Sealed this

Eighteenth Day of April, 2006

JON W. DUDAS
*Director of the United States Patent and Trademark Office*